UNITED STATES PATENT OFFICE.

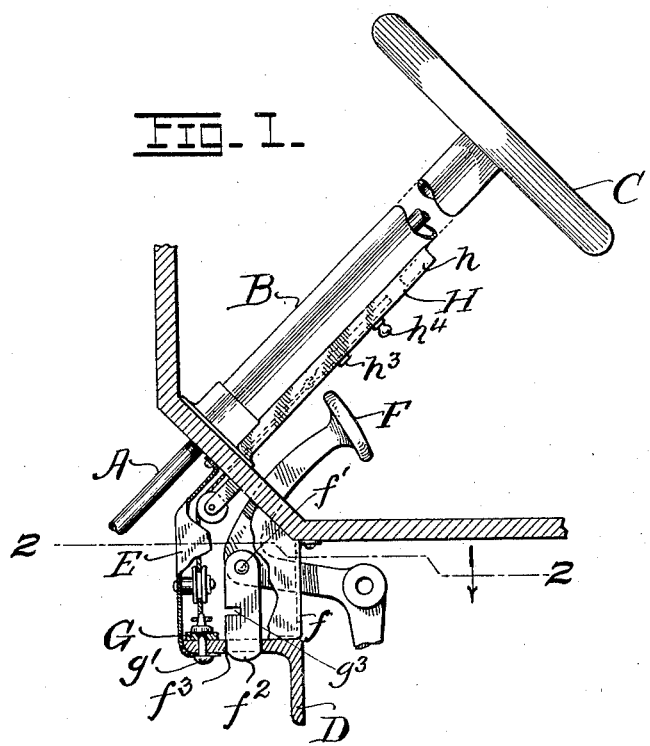
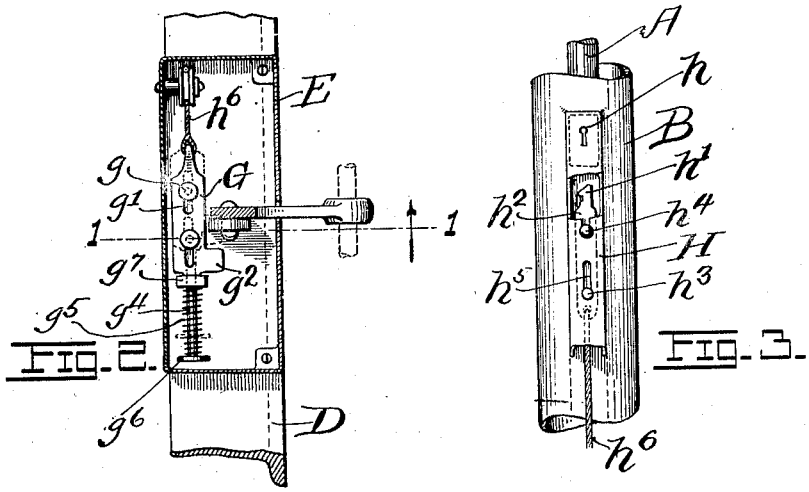

CHRISTOPHER W. DUNN, OF MILWAUKEE, WISCONSIN.

LOCKING DEVICE FOR AUTOMOBILES.

1,382,179.	Specification of Letters Patent.	Patented June 21, 1921.

Application filed December 26, 1919. Serial No. 347,403.

*To all whom it may concern:*

Be it known that I, CHRISTOPHER W. DUNN, a citizen of the United States, residing in the city of Milwaukee, county of Milwaukee and State of Wisconsin, have invented a certain new and useful Improvement in Locking Devices for Automobiles, and do hereby declare the following to be a full, clear, and complete description thereof, such as will enable persons skilled in the art to which the invention relates to manufacture and use the same, reference being had to the accompanying drawing for disclosure as to details of one construction in which the invention has been embodied.

My invention relates to a locking device for automobiles.

The invention is embodied in a construction which will lock the clutch shifting members in an open position, so that the clutch cannot be operated to connect the driving mechanism of the car while the parts are locked in their unclutched position.

The purpose of the invention is to provide means which will prevent the unauthorized operation of the automobile, and I achieve this result by devices of simple construction which will prevent such unauthorized movement of the car, and place the same under the control of the owner or operator of the car, who will be provided with a key for the locking mechanism.

My invention comprises a lock mounted upon the steering post of the automobile, which lock is connected to a sliding locking member adapted to be moved into engagement with the parts controlling the clutch, when the latter are properly positioned and the clutch members separated.

The locking mechanism is inclosed in a casing which prevents an outsider tampering therewith.

In the accompanying drawings

Figure 1 is a view in vertical section on the line 1—1 of Fig. 2, showing in elevation the steering post and wheel of a common type of automobile, and showing my locking mechanism in conjunction therewith.

Fig. 2 is a sectional plan view on the line 2—2 of Fig. 1 showing the locking devices; and Fig. 3 is a fragmentary view looking from the underside of the steering post and showing the arrangement of the lock by means of which the unauthorized operation of the automobile is prevented.

Like reference characters in the drawings are applied to the same part.

Referring to the drawings, A indicates the steering shaft of an automobile which is mounted in the steering post B and provided with a hand wheel C of usual construction, and mounted in the customary manner upon the footboard of the automobile.

A length of angle iron D is secured at its ends to the opposite side bars of the automobile frame and has mounted thereon a casing inclosing the members which serve to lock the clutch shifting devices in their inoperative position. This casing E will be so formed as to fill the space between the angle iron D and the foot-board of the automobile, so as to inclose the locking mechanism and prevent access thereto by unauthorized parties, without destroying the casing.

The clutch pedal F passing through the footboard works in a slot $f$ in the rear side of the casing, and has pivoted thereto at $f'$ a depending link $f^2$, guided in a restricted opening $f^3$ in the top of the angle iron D.

A sliding latch G is mounted on the upper side of the angle iron D and is guided thereon by studs $g$ in the angle iron and working in slots $g'$ provided in the latch. This latch G has a lug $g^2$ which is adapted to be passed into a notch $g^3$ in the depending link $f^2$ when the latter is depressed by the action of the pedal. The latch G is extended at one end and reduced as at $g^4$ for the reception of a spiral spring $g^5$ which is confined between a stud $g^6$ on the end of the reduced portion of the latch, and a fixed guide $g^7$ attached to the angle iron D, and perforated for the passage of the said reduced portion. The expansive force of the spring $g^5$ normally serves to hold the lug $g^2$ in the position indicated in Fig. 2 of the drawings, and out of engagement with the notch $g^3$ in the depending link $f^2$.

At the under side of the steering post, a casing H is affixed. This casing has at its upper end a lock $h$ of convenient construction, which is adapted to receive and retain the bolt $h'$ of a sliding member $h^2$ which is confined within the casing H and limited therein by pins $h^3$ and $h^4$ working in the slots $h^5$ in the lower side of the casing. The pin $h^4$ is elongated so as to provide a projecting knob by means of which the bolt $h'$ may be snapped into engagement with the lock. When such engagement is effected, the lock will hold the bolt until released by the application of a key to the lock.

Referring again to the slide G, a cable $h^6$ connects the end of the sliding member $h^2$ with the other end of the slide G, so that movement of the sliding member $h^2$ by pulling on the knob $h^4$ thereof transmits the motion to the slide G, to bring the lug $g^2$ into engagement with the notch $g^3$, when the latter is properly positioned. Suitable guiding pulleys for directing the course of the cable are provided.

From the foregoing, it will be seen that I have provided a locking device of simple and economical construction which will serve to prevent the operation of the automobile by persons not authorized to do so. Modifications of the construction may be made without departing from the spirit of my invention.

Having thus described my invention, what I claim and desire to secure by Letters Patent of the United States, is:—

1. In a locking device for automobiles, a pedal, a link pivoted thereto and provided with a locking notch, a slide provided with a lug for engaging the notch, when the pedal is in its lower position, in combination with a steering post, a casing secured thereto and containing a lock and locking bolt, and connections between the said slide and the bolt whereby the lug on the slide is engaged with the notch in the link, upon locking movement of the bolt, and a spring for withdrawing the slide to disengage the lug from the notch therein when the locking bolt is released from the lock.

2. In a locking device for an automobile, a pedal, a depending link provided with a notch pivoted thereto and guided for vertical movement, a spring retracted slide provided with a lug for engaging the notch when the pedal is depressed, and a casing inclosing the parts, in combination with a steering post, a casing attached thereto and containing a lock and locking bolt, and connections between the bolt and the slide for engaging the lug with the notch upon movement of the bolt.

3. A locking means for automobiles, comprising a pedal, a notched link actuated therefrom and moving in a fixed path, a slide provided with a lug for engagement with the notch and movable transversely to the link, a lock for holding the link and slide in engagement, and means connecting the lock and the slide to actuate the latter into locking position when the pedal is depressed.

In testimony whereof, I have signed my name at Milwaukee, this 18th day of December, 1919.

CHRISTOPHER W. DUNN.

Witnesses:
W. F. WOOLARD,
A. R. WOOLFOLT, Jr.